United States Patent
Ohashi et al.

[11] Patent Number: 6,162,906
[45] Date of Patent: Dec. 19, 2000

[54] CLARIFIED KONJAC GLUCOMANNAN

[75] Inventors: Shiroh Ohashi, Osaka, Japan; Gerald J. Shelso, Rockland, Me.; Arthur L. Moirano, deceased, late of Mountainside, N.J., by Marina Moirano, administrator; Walter L. Drinkwater, Camden, Me.

[73] Assignee: FMC Corporation, Philadelphia, Pa.

[21] Appl. No.: 07/742,260

[22] Filed: Aug. 8, 1991

[51] Int. Cl.[7] ............................. C07H 1/00; C07H 1/06; C07H 1/08
[52] U.S. Cl. ................... 536/1.11; 536/124; 536/127; 536/128; 426/573; 426/615; 426/655; 426/640; 426/658
[58] Field of Search ..................... 536/1.11, 127, 536/128, 124; 426/573, 615, 655, 640, 658

[56] References Cited

U.S. PATENT DOCUMENTS

| | | | |
|---|---|---|---|
| 2,144,522 | 1/1939 | Braun | 536/114 |
| 3,346,556 | 10/1967 | Foster et al. | 536/52 |
| 3,608,068 | 9/1971 | Fuller et al. | 424/44 |
| 3,767,424 | 10/1973 | Shimizu et al. | 426/640 |
| 3,856,945 | 12/1974 | Sugiyama et al. | 424/195.1 |
| 3,925,365 | 12/1975 | Izawa et al. | 528/487 |
| 3,928,322 | 12/1975 | Sugiyama et al. | 536/1.1 |
| 3,947,324 | 3/1976 | Lakshminaraya | 435/815 |
| 3,973,008 | 8/1976 | Sugiyama et al. | 424/195.1 |
| 4,036,655 | 7/1977 | Yamada et al. | 106/77 |
| 4,183,914 | 1/1980 | Gaffar et al. | 424/48 |
| 4,290,911 | 9/1981 | Cook et al. | 436/515 |
| 4,460,730 | 7/1984 | Koyama et al. | 524/404 |
| 5,049,401 | 9/1991 | Harada et al. | 426/573 |

FOREIGN PATENT DOCUMENTS

| | | |
|---|---|---|
| 58-165758 | 9/1983 | Japan . |
| 59-227267 | 12/1984 | Japan . |
| 63-68054 | 3/1988 | Japan . |
| 0149657 | 3/1989 | Japan . |

OTHER PUBLICATIONS

"Electrophoresis on Konjac Mannan Gel", Seibutsu Butsuri, 31, pp. 155–158 (1987) (+ translation).

*Primary Examiner*—Gary Geist
*Assistant Examiner*—Everett White
*Attorney, Agent, or Firm*—Mark A. Greenfield; Richard E. Elden; Patrick C. Baker

[57] ABSTRACT

A composition comprising a dry, clarified, water-soluble, konjac-derived glucomannan substantially free of insoluble impurities, having a nitrogen content of not greater than about 0.25 wt %, which has a turbidity potential as a 1.0% aqueous sol of not greater than about 20 turbidity units, as measured by the Formazin Turbidity Standard, as well as gels thereof; and methods for the preparation of the foregoing.

3 Claims, 1 Drawing Sheet

CLARIFIED KONJAC GLUCOMANNAN

BACKGROUND OF THE INVENTION

1. Field of the Invention

This invention relates to a clarified konjac which comprises konjac-derived glucomannan that is substantially free of insoluble impurities, has a reduced nitrogen content, and has a reduced aqueous sol turbidity potential; as well as sols and gels prepared therefrom.

2. Statement of Related Art

Konjac (*Amorphophallus konjac*) is a plant, the tuber of which is the source of a well-known foodstuff in China and Japan, namely konjac flour. This flour, which contains a variety of insoluble materials described below as well as a major amount of desirable water-soluble substances, comprises a highly viscous sol of glucomannan and soluble starches when reconstituted in water. The principal soluble constituent is glucomannan, which is useful as an ingredient in various foodstuffs, as well as in industrial applications such as films, oil drilling fluids, and paints.

There are numerous impurities in crude (native, unclarified) konjac flour, principally insoluble starches, cellulose, and nitrogen-containing materials, including proteins, many of which impurities are derived from "sacs" which encapsulate the konjac flour in the tuber. As a result, the sols and gels of crude konjac flour have a highly turbid, milky-white or cloudy appearance (due to water-swollen particulate impurities).

U.S. Pat. No. 3,928,322 to Sugiyama et al. (and U.S. Pat. No. 3,973,008, which is cumulative thereto) disclose a method for producing konjac mannan polysaccharide, that is, glucomannan, which comprises the principal ingredient of konjac flour, from raw konjac flour by first removing insoluble components from an aqueous konjac flour sol by filtration or other conventional means, thereafter dialyzing the sol and subjecting the resulting liquid to freeze-drying to obtain a turbid, cotton-like, low density fibrous product which is hard to grind and poorly soluble in water.

Japanese Application No. 01-49657, filed Mar. 1, 1989, discloses a konjac mannan which has a nitrogenous component of not more than 0.2%. However, the method of achieving this reduced nitrogen content is not disclosed.

U.S. Pat. No. 2,144,522 teaches a method for decolorizing and clarifying galactomannan gum sols such as locust bean gum which comprises contacting the gum sol with activated carbon in the presence of aluminum sulfate, the latter being added in amounts sufficient to form a double Al—Na salt with sodium sulfate which is intrinsically present in the activated carbon itself.

U.S. Pat. No. 3,346,556 discloses a method for preventing the degradation of galactomannan gums such as locust bean gum resulting from heat or pH changes which comprises adding to aqueous gum sols polar organic oxygen-containing hydrophilic stabilizers such as alcohols, glycols, ketones or the like. Incidental to this process there is disclosed in one example (Example 5) a means of clarifying locust bean gum by the conventional use of a filter aid such as diatomaceous earth.

Japanese Patent Disclosures 59-227,267 (Dec. 20, 1984), and 58–165,758 (Sep. 30, 1983) disclose methods for treating aqueous sols of crude konjac flour with certain salts at pH's of 10 or below to obtain an insoluble form of konjac, principally for use as insoluble food products.

Japanese Patent Disclosure 63-68054 (Mar. 26, 1988), discloses a reversibly soluble konjac gel product, but not the removal of insolubles which remain present in the product.

SUMMARY OF THE INVENTION

This invention provides a clarified konjac characterized in that it comprises konjac-derived glucomannan which is substantially free of insoluble impurities, has a nitrogen content of about 0.60 wt % or less, and has an aqueous sol turbidity potential of less than 20 turbidity units as measured at 1.0 w/v % concentration using the Formazin Turbidity Standard; as well as a method for preparing the same. Preferably, the clarified konjac is characterized by a nitrogen content of no greater than about 0.25%. More preferably the clarified konjac is characterized by a nitrogen content of no greater than about 0.175%. The Invention also provides sols and gels of this clarified konjac.

The term "clarified" konjac, as used herein, refers to a konjac glucomannnan which is substantially free of insoluble impurities, which has a lower nitrogen content than unclarified konjac, and which exhibits a lower turbidity than unclarified konjac when in the form of an aqueous sol or gel. The term "crude" konjac, as used herein, refers to an unclarified or native konjac flour in which the glucomannan is still contained in the sacs in which it occurs in nature, and various other impurities may be present.

The clarified glucomannan product of this invention may be prepared by dispersing the konjac flour in water, and treating the resulting dispersion with a salt such as aluminum sulfate, to extract the impurities which are present. Such impurities are principally naturally-occurring from the konjac tuber as for example nitrogenous materials such as proteins, or insoluble fibers, starches, or the like. The extraction is then followed by separating the impurities from sol, coagulating the resulting glucomannan from the remaining sol by the addition of a water-miscible coagulant such as an alcohol, and drying and grinding the resulting coagulate to form the clarified glucomannan of this invention in powder form. This dry product, when dissolved in water, then provides the improved material to which other components, particularly food components, may then be added. This method is particularly advantageous in that it can be completed significantly faster than known prior methods.

The inventive methods afford additional advantages over unclarified (crude) konjac flour, namely improved odor, color, solubility, and grindability. Crude konjac has a known distinct odor, and a tan to dark brown color (as a dry powder). Furthermore, crude konjac particles are not uniform in size and cannot be ground at normal milling temperatures. Milling or other such grinding of crude konjac produces high temperatures which destroy its viscosity potential in much the same way as dry heat degradation, and which contribute to its dark color. By contrast, the clarified konjac of this invention is a white powder which forms a clear sol, is odor-free and can readily be ground to a uniform size. Additionally, clarified konjac is more uniform in gum content, and thus avoids the wide, uncontrolled variations in viscosity or gel strength which occur with crude konjac.

Another desireable property of the clarified konjac powder of this invention is that, unlike crude konjac, it hydrates rapidly when placed in water, at room temperature and with little effort, thereby facilitating the utilization of konjac in various food recipes as well in the rapid preparation of sols and gels.

DESCRIPTION OF THE DRAWING

The Figure is a graph which compares the nitrogen and turbidity values of the composition of this invention with the nitrogen and turbidity values of prior art products, including crude konjac.

DETAILED DESCRIPTION OF THE INVENTION

Figure 1:
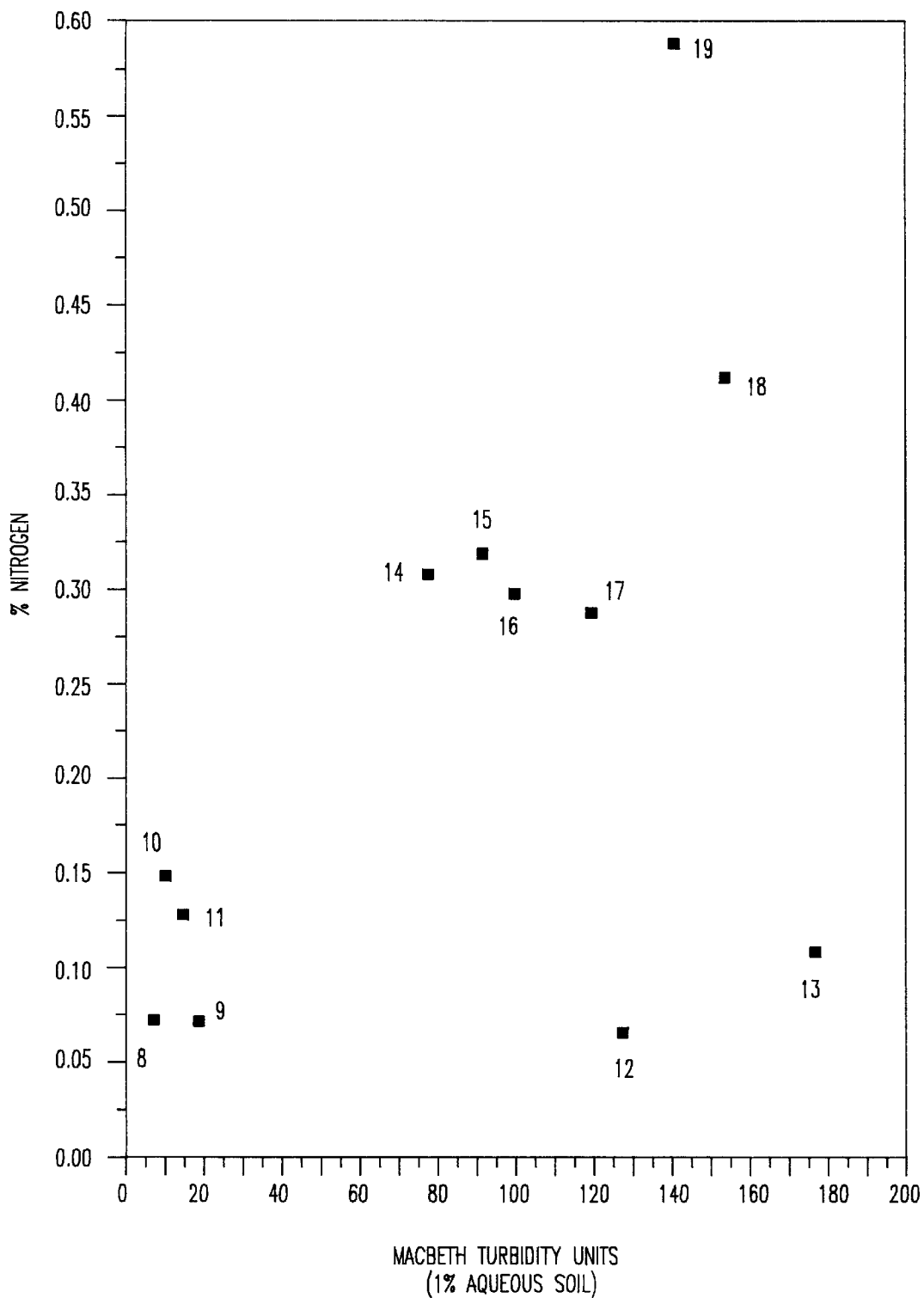

Other than in the operating examples, or where otherwise indicated, all numbers expressing quantities of ingredients, parameters, or reaction conditions used herein are to be understood as modified in all instances by the term "about".

Crude Konjac Starting Material

Crude konjac flour starting material is a commercial product available from a number of sources. One source, and method for preparing konjac flour, is disclosed in Marine Colloids Bulletin K-1, "NUTRICOL® Konjac Flour" (1989) [product and bulletin of FMC Corporation, Marine Colloids Division, Philadelphia, Pa., 19103 U.S.A.]. Basically, the process involves slicing, drying and then wet- or dry-milling the *Amorphophallus tuber*, followed by pulverization of the resulting konjac to a powder ("flour") which is sifted and air classified. The resulting flour, as described in the above publication, consists of fine, oval, whitish granules containing "flour sacs", that is, the glucomannan is encapsulated in a protein/fiber coating. This flour, when hydrated for some time with agitation releases the encapsulated glucomannan to form a sol which is characterized principally by its high viscosity, even at 1% concentrations, substantial turbidity, and high nitrogen content. Viscosities in the range of 8,000 cps at a 1% by weight sol up to 130,000 cps at 3% are typically obtained after a heat (85° C.) and cool cycle, as measured on a Brookfield® RVT Viscometer, and an appropriate spindle, at 20 rpm and 25° C. [the viscometer is a product of Brookfield Engineering Laboratories, Inc. Stoughton, Mass., U.S.A.]. Conversion of Brookfield centipoise (cps) readings into viscosity functions are discussed by Mitschka, P. in *Rheologica Acta*. 21:207–209 (1982). As used herein, centipoise (cps) is equivalent to milli-Pascals·second (mP·s).

The crude konjac turbidity may vary considerably, depending upon the concentration of the sol, but in the above viscosity range of from 8,000 cps up to 130,000 cps and concentrations of 1% to 3%, turbidities of 100 to 300 turbidity units are conventionally obtained at 0.5 wt. % concentration, based on the Formazin Turbidity Standard (FTS)—Method 180.1 in "Methods of Chemical Analysis of Water and Wastes" by EPA Environmental Monitoring and Support Lab; March, 1979. At these turbidities the sol is generally very cloudy to milky in appearance.

The high nitrogen content of the initial crude konjac flour is essentially a function of the amount of impurities present, principally the tuber's naturally-occurring protein and the sac fiber coating which encapsulates the glucomannan. The nitrogen content of the dry crude flour is typically in the range of 0.3 to 1.3 wt. % of nitrogen, although higher percentages are possible depending upon the variety of tuber used.

Product Description

As a measure of the significantly reduced amount of impurities present, the clarified products of this invention are characterized principally by their low nitrogen content and low turbidity potential as aqueous sols. The corresponding viscosity of the product, in sol form, is also characteristically at a high level, i.e. it is not adversely affected by the salts employed in the extraction process.

As shown in the Figure, a 1.0% aqueous sol of the clarified konjac of this invention has a turbidity of less than 20 turbidity units, as measured by a Macbeth Coloreye Computer, model 1500, (Kollmorgen Corp., Newburgh, N.Y.), using a Formazin Standard.

The clarified konjac of the invention, regardless of form, has a nitrogen content of 0.60 wt % or less, preferably no greater than 0.25 wt. %, more preferably no greater than 0.175 wt. %, and most preferably no greater than 0.15%.

Within these ranges the clarified konjac sol is substantially transparent in appearance and may be used in a number of applications, particularly in foodstuffs where a clear, particle-free gel is essential, or where a highly viscous material is desired.

The clarified konjac of this invention may further be characterized in that the viscosity of a 1.0 w/v % clarified konjac/water sol thereof is about 1,000 to 25,000 cps as measured using a Brookfield Viscometer Model LVTDV-II at 25° C. and 20 rpm.

While the turbidity of flour and product samples is generally determined by using visible light, ultraviolet (UV) light may also be employed to characterize the clarified product and gauge the effectiveness of clarification procedures. This may be achieved by preparing 0.5% aqueous sols of product, placing them in cuvettes and measuring their UV absorbance between 200 and 320 nanometers (nm). Impurities, including DNA and protein, absorb UV light in the 260–280 nm region and peaks in this area indicate their presence and relative amounts. Crude samples contain a broad peak in this region and, overall, have a higher baseline of absorbance than clarified samples, which lack the 260–280 peak.

TABLE I

| Konjac Sample | Absorbance | | | |
| --- | --- | --- | --- | --- |
| | A320 | A280 | A260 | A220 |
| Crude | 0.5140 | 0.8781 | 0.9634 | 2.6115 |
| Clarified | 0.0647 | 0.0967 | 0.1222 | 0.3118 |

Method Description

The method for the production of the clarified konjac of this invention may be characterized by the consecutive steps of:

[a] preparing an aqueous sol of crude konjac comprising insoluble impurities, starch and glucomannan;

[b] contacting the crude konjac sol with an extraction salt selected from one or more of dicalcium phosphate, calcium phosphate, and magnesium phosphate (preferably aluminum sulfate) in an amount effective to extract the insoluble impurities by precipitation;

[c] precipitating and removing (such as by filtration) and then discarding the insoluble impurities precipitate;

[d] forming a glucomannan coagulate by treating the remaining aqueous sol with one or more water miscible coagulating agents selected from $C_{1-4}$ lower alcohols such as methanol, ethanol, or 2-propanol or water miscible polar organic solvents such as acetone, methylethyl ketone, or their mixtures [of which coagulating agents 2-propanol (isopropyl alcohol) is preferred], used in an amount sufficient to coagulate substantially all glucomannan from the sol; and

[e] removing and drying the glucomannan coagulate to recover the clarified glucomannan.

By the term "extracting" or "extraction", as used herein, is meant the removal of insoluble impurities from the konjac by aggregation, adsorption, or precipitation. Aluminum sulfate has been found to be the most effective extraction salt although dicalcium phosphate, calcium phosphate, and magnesium phosphate may also be used. Isopropyl alcohol has been found to be the most effective coagulant, although other water-miscible coagulants may be used. The coagulate may be dried and ground to particulate form using means known in the art.

The individual steps and conditions of the inventive method may be varied somewhat. In general terms, the one or more extraction salts may be blended with the crude konjac flour starting material, and, if desired, a filter aid, and the dry mixture dispersed with agitation into a sufficient amount of water to obtain the desired concentration of the glucomannan in the crude konjac sol, 0.1 to 10 wt. % depending on the viscosity potential, more preferably 0.5 to 3 wt. %.

Alternatively, the one or more extraction salts may be added to the water either before or after the aqueous dispersal of the crude konjac. While this dispersion may be carried out in water at ambient temperatures, preferably the water should be heated to temperatures of from 70 to 100° C., more preferably 85 to 90° C. for 15 to 60 minutes in order to speed up the process. It will be understood that temperatures, mixing rates, and concentration of reactants may be varied routinely by those skilled in the art in order to optimize these operating conditions.

The filtration step removes the insoluble impurities, and may be conducted with or without the presence of a filter aid. Filters such as glass wool, paper, cloth, and fibrous mats may be used for this purpose, although any filter which will remove insoluble particles is satisfactory. Filter aids which may be employed include perlite and diatomaceous earth. The amount of filter aid is not critical, but is desirably employed in amounts of up to 1–5 times the weight of the crude konjac flour. The filter cake is preferably then washed with hot water until no further clarified konjac glucomannan is recovered.

Water-miscible coagulating agents which may satisfactorily be used include $C_{1-4}$ lower alcohols such as methanol, ethanol, or 2-propanol or water miscible polar organic solvents such as acetone, methylethyl ketone, or their mixtures, 2-propanol (isopropyl alcohol) being preferred. The amount of coagulating agent added is not critical, but it should be at least a coagulation-effective amount sufficient to recover the glucomannan as a coagulant from the remaining sol, preferably in a coagulant:glucomannan weight ratio of 1–4:1, or volume ratio of 2–3:1.

Drying of the coagulate should be carried out until it is capable of being ground to a fine powder. This may be achieved, for example in a forced hot air oven at ambient temperatures. The resulting dry product is then ground to form particles of any desired size, preferably by grinding it, for example, through a 100 mesh (149 micron) screen.

The ready solubility of the clarified konjac according to this invention is one of the several characteristics that distinguish it from the non-clarified starting material of the inventive method. The desired percent concentration of the composition in sol will depend largely on its intended use and its viscosity. As stated above, 0.1 to 10 wt %, preferably 0.5 to 3.0 wt %, based on the total weight of the sol, may be employed, although these amounts are not critical. In addition, it will normally maintain a very high viscosity despite the several treatment steps described herein, which is particularly desirable in food use.

Moreover, as a further advantage of this invention, this sol not only normally develops a high viscosity, generally in the range of from 1,000 to 25,000 cps, at 1.0 w/v % concentration and 25° C., as measured on a Brookfield Viscometer, Model LVTDV-II, with a suitable spindle at 20 rpm's, but also, because of the rapid hydration properties of the clarified dry powder, it develops this viscosity rapidly. Thus, when regular, unclarified konjac flour is dispersed in water to form a 1 wt % sol, the hydration normally takes about two hours to form a sol of desired viscosity. By contrast, under substantially the same conditions, hydration of the product of this invention takes about 30 minutes to achieve the same viscosity development.

The resulting substantially clear sol may then readily be converted to a clarified konjac gel by known means for gelling konjac, such as admixing a known gelling agent for konjac in a gelling-effective amount at known temperatures.

If desired, the extraction salts may be formed in situ during the extraction steps by known means. The amount of these salts is not critical, but should be an amount effective to coagulate the glucomannan, preferably from 1 to 25 wt %, more preferably 5 to 15 wt %, based on the weight of the crude konjac.

The amount of clarified konjac which may be employed when incorporated in foodstuffs or industrial compositions is essentially the same as that of crude konjac, the advantages of clarified konjac over crude konjac being in the purity, appearance and hydratability of the clarified product. For example, amounts of 0.1 wt % may be used in cake mix, while in industrial applications such as films, oil drilling fluids, and paints, amounts ranging from 1–2% and upward may be employed.

EXAMPLE 1 (Dicalcium Phosphate)

Six hundred ml of distilled water was heated to about 75–78° C. in a hot water bath. Dicalcium phosphate was used as the extraction agent by adding 0.6 g (10% w/w with crude konjac) to the water. Six grams of crude konjac (FMC lot # 89-9609) were then added and stirred for 60 minutes while maintaining the temperature. After the "cook", 15 g of filter aid ("Celatom" diatomite, Eagle Pitcher Industries Inc., Cincinnati, Ohio) was added and filtration was carried out in a 1 liter pressure filter bomb which had been assembled using only a fitted piece of filter cloth. The filter bomb was preheated with boiling water which was then allowed to drain. The sample was poured into the filter bomb and 25 psi (1.75 kg/cm$^2$) pressure was applied for 10 minutes. The pressure then was increased to 40 psi (2.8 kg/cm$^2$) for 40 minutes. Only 50 ml of filtrate was collected during this time so the sample was removed from the filter bomb, pooled with the small amount of filtrate and an additional 85 g of filter aid admixed. The filter bomb was cleaned, reassembled and preheated. Filtration was repeated at the following times and pressures: 10 minutes at 10 psi (0.7 kg/cm$^2$); 30 minutes at 25 psi (1.75 kg/cm$^2$); 60 minutes at 40 psi (2.8 kg/cm$^2$); and 10 minutes at 60 psi (4.2 kg/cm$^2$). The total filtration time was 120 minutes, during which 250 ml of filtrate was collected. The filtrate was coagulated in 2× volume 99% 2-propanol and allowed to stand for 60 minutes. The coagulant was collected by vacuum filtration, squeezed dry and transferred to 2×volume 60% 2-propanol for 30 minutes. The coagulant was again recovered and then dried at 55° C. overnight (14 hours) in a forced hot air oven. The sample was weighed (1.65 g or 27.4% yield) and ground through a 40 mesh screen. This material had a 1% viscosity of 4,410 cps as measured on a Brookfield Digital Viscometer, Model LVTDV-II, No. 1 spindle at 25° C.

EXAMPLE 2 (Aluminum Sulfate)

Following the procedure of Example 1, 0.6 g aluminum sulfate was added prior to the konjac instead of dicalcium phosphate. After 35 minutes, 500 ml of filtrate was collected and then processed. The dried sample, 3.15 g or 52.6%, was ground and used to prepare a 1% sol and gel. The viscosity was determined to be 2,170 cps using the same measuring parameters.

EXAMPLE 3 (Aluminum Sulfate—In Situ)

To 600 ml distilled water, 0.747 g monobasic sodium sulfate and 0.847 g aluminum chloride were added with stirring. No filter aid was used and 500 ml filtrate was collected after 11 minutes at 5 psi (0.35 kg/cm$^2$). This material was processed, dried and ground producing 4.20 g; (70% yield). This material had a 1% viscosity of 1,720 cps using the measuring parameters of Example 1.

EXAMPLE 4 (Aluminum Sulfate—In Situ)

The above extraction was repeated with a few changes. 0.526 g of the aluminum chloride (0.291 g anhydrous $AlCl_3$) and 0.310 g monobasic sodium sulfate were used in this instance. Additionally, 25 g of filter aid was added before filtration. Over 98 minutes, 450 ml of clear filtrate was collected and then processed. After drying, 3.65 g (60.9% yield) of material was ground and used to prepare a 1% sol. The sol, which was very clear, had a viscosity of 1150 cps using the measuring parameters of Example 1.

EXAMPLE 5 (Dicalcium Phosphate—In Situ)

0.694 g calcium chloride and 0.567 g monobasic sodium phosphate was used in the extraction. Again, no filter aid was used and 340 ml filtrate was collected and processed producing 2.90 g; (48.3% yield). This sample had a 1% viscosity of 17,000 cps using the measuring parameters of Example 1.

EXAMPLE 6 (Dicalcium Phosphate—In Situ)

The above extraction was repeated. The amount of $CaCl_2.2H_2O$ was reduced to 0.382 g (0.288 g anhydrous $CaCl_2$ or $2.6 \times 10^{-3}$ mols) whereas the amount of $NaH_2PO_4$ dropped to 0.312 g ($2.6 \times 10^{-3}$ mols). Filter aid (25 g) was added before filtration, which proceeded slowly. Only 150 ml of filtrate was collected after 147 minutes. This extraction attempt was abandoned at this point.

EXAMPLE 7 (Aluminum Sulfate)

To a 225 gallon (about 852 liter) stainless steel tank, 140 gallons (530 liters) cold water, 214 g aluminum sulfate (4.71%) and 162 ml 3M NaOH was added and heated with direct steam to 70° C. 10 lbs. (4536 g) konjac flour and 31 lbs. of FW 40 filter aid was mixed in. Total volume was 160 gallons (606 liters) which was 0.75% konjac w/v. The sample was heated to 85° C. and held 15 minutes. The sample was then filtered in a preheated 18 inch stainless steel filter press with recycling occurring during the first 5 minutes. Total filtration time, including flushing the filter press with hot water, was 60 minutes. The filtrate was coagulated in 300 gallons (1,136 liters) 85% isopropyl alcohol IPA. The coagulate was recovered by screening and by pumping it through bags which were subsequently squeezed in a small press. The coagulate was then washed/hardened in 75 gallons of 85% IPA for 2 hours with air agitation. The coagulate was recovered by screening and then squeezed by hand to remove excess liquid and subsequently dried at 55° C. overnight. The sample, 6.4 lbs (2.9 kg) or 64% yield, was ground through a 0.039 inch (2.4 mm) screen. It had a nitrogen content of 0.15% and a 1% turbidity of 11 NTUs (Nephelometric Turbidity Units).

EXAMPLES 8–19 (Nitrogen and Turbidity Content of Clarified Konjac)

Selected products obtained from previous examples were measured to determine their nitrogen content and turbidity level. (Ex. 8–11). These results were compared with the nitrogen content and turbidity level of both crude konjac flour, (Ex. 13 and 15–19) and the products of the process described in U.S. Pat. No. 3,928,322 (Ex. 12) as well as those of the product of Ogasawara et al., (Ex. 14) described in "Electrophoresis on Konjac Mannan Gel", Seibutsu Butsuri, 31, pp. 155–158 (1987), which represents a slight modification of the U.S. Pat. No. 3,928,322 process. The results of all of these tests are set forth below in Table II, and in the Drawing, wherein all nitrogen values are based on the dry weight of the product.

In Table II, as described in footnote (b), certain of the turbidity values were first obtained on a Fisher Spectrophotometer, Model II (Fisher Scientific, Pittsburgh, Pa.), using a Formazin Standard and then converted to Macbeth Coloreye values. This conversion was carried out through a correlation study, as follows: 11 Formazin standards, with turbidity values ranging from 5 to 400 NTU's, were prepared and measured (% transmittance) on both the Macbeth and Fisher units. Additionally, 5 konjac samples (3 crude and 2 clarified) were prepared at concentrations of 1%, 0.5%, 0.25% and 0.125% and also measured on both units. The data (% transmittance) from these measurements were plotted against their turbidity values, as determined on each machine, and a correlation coefficient determined.

The process of U.S. Pat. No. 3,928,322—Sugiyama (Example 12) was carried out as follows:

1. 2.5 g konjac flour (89-9607) was suspended in 500 ml (0.5% w/v) tap water and heated at ~55–60° C. for 2 hours.
2. The sol was passed through a 115 mesh (125 micron) and then a 270 mesh (53 micron) metal screen to remove gross insolubles.
3. The sol would not filter through a medium porosity glass filter (Pyrex 150 ml, ASTM 10–15) or a 0.2 micron filter so instead was heated to 90° C. and twice passed through a 14 inch -1 inch diameter (35.6 cm–3.54 cm diameter) bed of tightly packed glass wool. The filtrate, 300 ml, was very clear and appeared to be particle-free.
4. The filtrate was placed in a piece of dialysis tubing (Spectra/Por, 47.7 mm×75 mm, molecular weight cut off of 12→14,000 daltons). The sample was dialyzed against 4 liters of tap water for 48 hours (the water was changed after 24 hours).
5. The sample was then poured into 2 large crystallizing dishes and frozen.
6. Each aliquot was lyophilized at 0.6 Torr with a shelf temperature of 100° F. (37.8° C.) for 12 hours.
7. The dried sample was very white and quite fluffy. The yield was 1.137 or 45.5%. Due to excessive static, the sample could not be ground and was wetted with a small amount of 20% isopropyl alcohol and then dried at 55° C. for 3 hours. The sample was then ground through a 40 mesh screen.
8. The sample had a nitrogen content of 0.07% and a 0.5% turbidity of 66 Turbidity Units.
9. The process took a total of 68 hours to run.

The Ogasawara process (Example 14) was carried out as follows:

1. 10 g crude konjac was suspended in 100 ml 50% ethanol and stirred for 1 week.
2. This material was centrifuged and the pellets were transferred to 100 ml 80% ethanol for 3 days with stirring.
3. This was again centrifuged (4000 rpm, 10 minutes) and the pellets transferred to 100 ml 100% (absolute) ethanol for 1 hour.
4. The sample was recovered on #54 Whatman filter paper by vacuum filtration, and dried in a 60° C. oven for 6 hours.
5. 8.992 g of material was recovered and was used to prepare a 5% sol in 178 ml. This was too viscous to treat, and was diluted 10 fold to 1780 ml (0.5% w/v) and allowed to sit overnight at room temperature.
6. This material was centrifuged for 75 minutes at 9500 rpm.
7. The supernatant (1700 ml) was dialyzed in 10 volumes of distilled water for 3 days at room temperature.
8. The sample was removed from the dialysis tubing and centrifuged at 7500 rpm for 10 minutes.
9. Half of the supernatant was coagulated while the other half was placed in dialysis tubing and covered with polyethylene glycol (PEG 20) to reduce the volume from 850 ml to 450 ml.
10. This material was frozen at −75° C. for 45 minutes and then lyophilized at 0.1 Torr and 100° F. (37.8° C.) for 3 days.
11. 2.19 g of the lyophilized material was recovered and was very white and fluffy in appearance.
12. All samples were vacuum dried to remove any moisture before testing. The lyophilized material foamed excessively when the sol was prepared for turbidity measurements.
13. This process took a total of ~384 hours to run.

TABLE II

| Example | Extractant/Source | % Nitrogen[c] | Turbidity[d] |
|---|---|---|---|
| INVENTION | | | |
| 8 | Alum, pilot plant | 0.07 | 7 |
| 9 | Alum, pilot plant | 0.07 | 18 |
| 10 | Alum, pilot plant | 0.15 | 11[e] |
| 11 | Alum, pilot plant | 0.13 | 14 |
| PRIOR ART | | | |
| 12 | Sugiyama Patent | 0.07 | 128[b] |
| 13 | Crude/Hydro washed | 0.11 | 177 |
| 14 | Ogasawara Publ. | 0.31 | 80[b] |
| 15 | Crude | 0.32 | 92[a] |
| 16 | Crude | 0.30 | 101 |
| 17 | Crude | 0.29 | 120 |
| 18 | Crude | 0.41 | 155[a] |
| 19 | Crude | 0.59 | 142 |

[a] sample centrifuged at 4000 rpm for 5 minutes before analysis
[b] the values originally obtained on a Fisher Spectrophotometer, then converted into Macbeth equivalents as determined by a regression line obtained by plotting values obtained from a correlation study of identical samples measured on both instruments.
[c] based on the dry weight of the product.
[d] as measured on a Macbeth Coloreye Computer (Series 1500), using a Formazin Standard.
[e] measured at 1 w/v %, all others at 0.5 w/v %.

From the foregoing results it will be seen that whereas the nitrogen and turbidity values of the products of this invention (Examples 8–11) were both low, the corresponding values of the crude konjac, as well as one or both of the Sugiyama and Ogasawara products, were significantly higher by comparison.

We claim:

1. A method for production of a clarified konjac glucomannan which is substantially free of insoluble impurities; has a nitrogen content of about 0.60 wt. % or less; and readily dissolves in water to form a sol or gel having an aqueous sol turbidity potential of less than 20 turbidity units as measure at 1.0 w/v % concentration using, the Formazin Turbidity Standard, comprising the steps of:

(a) preparing an aqueous sol of crude konjac comprising insoluble impurities and glucomannan;
   (b) contacting the crude konjac sol with an extraction salt selected from one or more of dicalcium phosphate, calcium phosphate, magnesium phosphate, and aluminum sulfate in an amount effective to extract the insoluble impurities by precipitation;
   (c) precipitating and removing the insoluble impurities;
   (d) forming a glucomannan coagulate by treating the remaining aqueous sol with isopropyl alcohol present in an mount sufficient to coagulate substantially all glucomannan therein; and
   (e) removing and drying the glucomannan coagulate to recover the clarified konjac glucomannan.

2. The method of claim 1 characterized in that dicalcium phosphate is the extraction salt.

3. The method of claim 1 characterized in that aluminum sulfate is the extraction salt.

* * * * *